United States Patent [19]
Schultz

[11] Patent Number: 5,516,379
[45] Date of Patent: May 14, 1996

[54] CTI PROGRAM PRESSURE SETTING OVERRIDE

[75] Inventor: Gary R. Schultz, Kalamazoo, Mich.

[73] Assignee: Eaton Corporation, Cleveland, Ohio

[21] Appl. No.: 326,562

[22] Filed: Oct. 20, 1994

[51] Int. Cl.[6] .................................................. B60C 23/02
[52] U.S. Cl. ........................ 152/415; 152/416; 73/146.2; 73/146.3; 141/4; 141/38; 141/95; 364/424.01; 364/424.03; 364/558
[58] Field of Search ........................ 152/415, 416, 152/417; 141/1, 4, 38, 95, 197; 73/146.2, 146.4, 146.5, 146.3; 364/558, 424.01, 424.03

[56] References Cited

U.S. PATENT DOCUMENTS

| | | | |
|---|---|---|---|
| 4,298,047 | 11/1981 | Bobard | 152/417 |
| 4,510,979 | 4/1985 | Hjorth-Hansen | 141/95 |
| 4,640,331 | 2/1987 | Braun et al. | 152/417 |
| 4,678,017 | 7/1987 | Schultz | 152/416 |
| 4,744,399 | 5/1988 | Magnuson et al. | 152/417 |
| 4,754,792 | 7/1988 | Braun et al. | 152/417 |
| 4,782,879 | 11/1988 | Le Chatelier et al. | 152/417 |
| 4,804,027 | 2/1989 | Runels | 152/417 |
| 4,844,138 | 7/1989 | Kokubu | 152/417 |
| 4,862,938 | 9/1989 | Mittal | 152/417 |
| 4,872,492 | 10/1989 | McAnally et al. | 141/38 |
| 4,883,106 | 11/1989 | Schultz et al. | 152/417 |
| 4,898,216 | 2/1990 | Schultz et al. | 141/4 |
| 4,905,742 | 3/1990 | Mohs | 141/38 |
| 4,922,946 | 5/1990 | Boulicault | 137/102 |
| 4,924,826 | 5/1990 | Schultz et al. | 152/417 |
| 5,035,274 | 7/1991 | Kinnick et al. | 141/38 X |
| 5,174,839 | 12/1992 | Schultz et al. | 152/415 |
| 5,180,456 | 1/1993 | Schultz et al. | 152/416 |
| 5,253,687 | 10/1993 | Beverly et al. | 152/416 |

*Primary Examiner*—Michael W. Ball
*Assistant Examiner*—Francis J. Lorin
*Attorney, Agent, or Firm*—Jennifer M. Stec; Howard D. Gordon

[57] ABSTRACT

An adaptive tire pressure control strategy for a central tire inflation system (10) wherein the programmed demand pressure setting $P_D$ may be increased automatically if certain criteria are met. These criteria are indicative of a running condition wherein tire temperature may be increasing to unacceptable levels due to underinflation. Additionally, air may also be added to tires in this condition in order to increase the load capacity of the tire, reduce tire temperature and prolong tire life.

19 Claims, 4 Drawing Sheets

CTI PROGRAM PRESSURE SETTING OVERRIDE

BACKGROUND OF THE INVENTION

This invention relates generally to central tire inflation systems (CTI Systems or CTIS) and, more particularly, to a method for adaptively controlling the demand pressure setting in a central tire inflation system in order to improve performance and prolong tire life.

Central tire inflation systems are well known as may be seen by reference to U.S. Pat. Nos. 4,640,331; 4,678,017; 4,754,792; 4,782,879; 4,804,027; 4,883,106; 4,898,216; 4,922,946; 4,924,926; 5,174,839; 5,253,687; 5,180,456; and published European Patent Applications 0,297,837; 0,352,921, the disclosures of which are incorporated herein by reference. Each of these systems allow a vehicle operator to remotely vary the air pressure in vehicle tires to dynamically alter the tractive ability of the tires depending upon the terrain and the load carried by the vehicle.

In order to accomplish this, a system controller is preprogrammed with a series of tire pressures, each corresponding to a particular "operating mode" or set of conditions under which the vehicle is to be operated. These pressures are selected based upon a number of factors including tire manufacturer's recommendations and the anticipated loads to be carried and speeds to be driven. As the vehicle is operated, the driver indicates the current operating mode via a control panel thereby causing the CTIS controller to select the preprogrammed pressure corresponding to that mode. The controller attains the programmed pressure by issuing command signals to electronically controlled pneumatic components of the system which cooperate to automatically inflate or deflate the tires as required.

However, allowing an operator to program pressures from the control panel of the CTIS creates the possibility that the operator will program a tire pressure that is too low for the particular loads and/or speeds eventually encountered. If the programmed pressure is too low for a given load, speed or road condition, this may cause the air in the tires to rise in temperature to an excessive level which can lead to a reduced tire life.

Therefore there exists a need to account for tire pressure programming miscalculations and/or errors in order to optimize operating conditions while still providing the vehicle operator with needed control.

SUMMARY OF THE INVENTION

The CTIS tire pressure control strategy of the present invention addresses this need by providing an adaptive control strategy wherein the preprogrammed tire pressure setting may be raised automatically if certain conditions are met. These conditions are based upon the premise that tire pressure rises in proportion to the temperature of the pressurized air therein. Given certain maximum limits in the amount the pressure of a properly inflated tire should normally be allowed to rise, the preprogrammed settings can be adjusted accordingly.

To accomplish this, when the CTIS performs a periodic pressure check sequence to maintain tire pressure in a predetermined range for a given mode of operation, the measured pressure is compared to the preprogrammed demand pressure setting for that mode. If the actual pressure exceeds the demand pressure setting by at least a predetermined amount, the controller assumes that the additional pressure has been heat generated and may adjust the preprogrammed setting upward. The precise amount of upward adjustment can vary and may be made dependent upon any number of factors such as the currently selected operating mode. In addition, air may also be added to the affected tires in order to immediately increase tire load capacity and thereby reduce the temperature of the pressurized air therein.

By adjusting the preprogrammed settings when an indication of a heat induced rise in pressure is indicated, operation of a tire at a recommended pressure can be better ensured. The further addition of air to a tire having a significant heat induced rise in pressure enhances the load capacity of the tire, thereby reducing air temperature and prolonging tire life. These and other advantages of the present invention will become apparent upon review of the following description taken in conjunction with the accompanying drawings.

DETAILED DESCRIPTION OF THE PREFERRED EMBODIMENT

Figure 1:
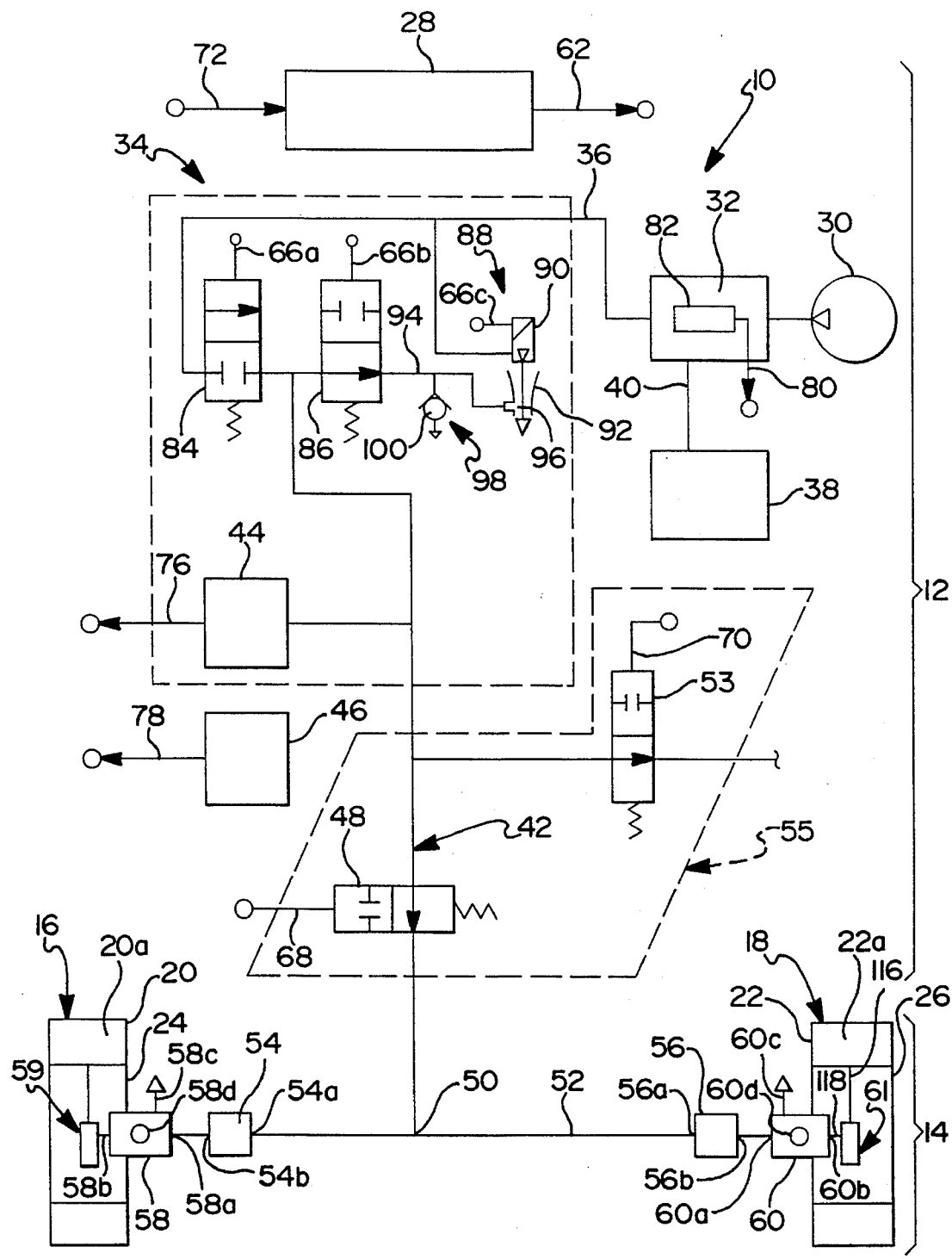
FIG. 1 is a schematic illustration of the present CTI system components.

Turning now to the drawings, the schematic of FIG. 1 illustrates a CTIS 10 exemplary of the type in which the program pressure override routine of the present invention may be implemented. However, it should become readily apparent that the present routine could be implemented in any one of a variety of types of central tire inflation systems. CTIS 10, in combination with the vehicle on which it has been installed, has body/chassis mounted components 12 as well as axle mounted components 14. Axle mounted components 14 include left and right wheel assemblies 16 and 18 which may be attached to a steer or nonsteer axle, a drive or nondrive axle and/or a tandem axle. The vehicle is preferably, but not necessarily, of the heavy duty truck type or special duty type and wheel assemblies 16 and 18 may be either of the single or dual wheel type. In this exemplary embodiment, CTIS 10 measures and controls the inflation pressure of interior volumes 20a, 22a of inflatable tires 20,22 mounted on wheels 24,26 of wheel assemblies 16 and 18.

Figure 2:
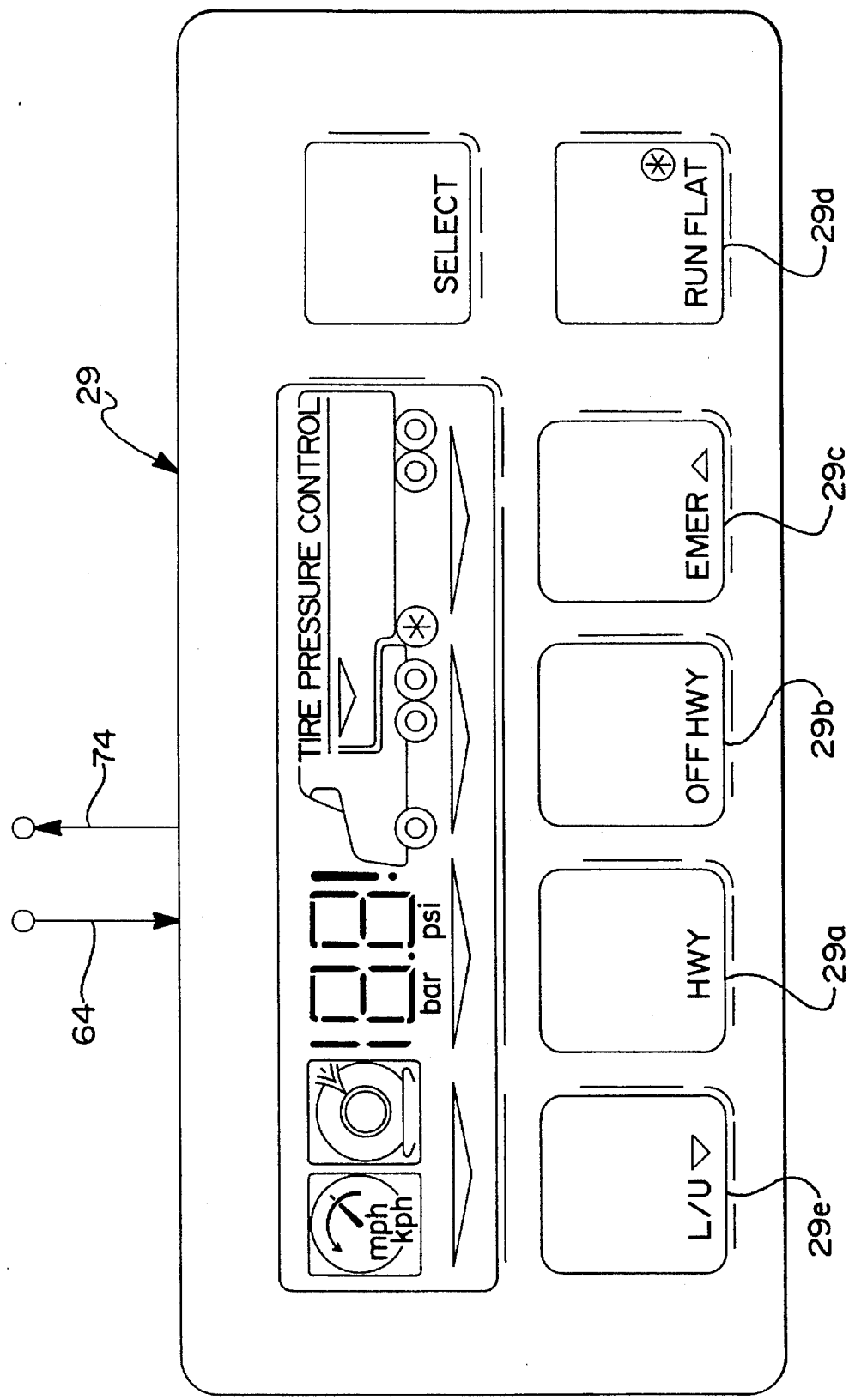
FIG. 2 is a schematic illustration of an operator control panel for the system shown in FIG. 1.

The chassis mounted components 12 of CTIS 10 include a microprocessor-based electronic control unit (ECU) 28 which generates electronic control signals based upon input signals received from a vehicle operator control panel 29 such as that shown in FIG. 2, as well as from a number of additional sensors. A source of pressurized fluid, preferably an air compressor 30 driven by the vehicle engine, provides pressurized fluid directly to an air tank or wet tank 32. Wet tank 32 serves as a reservoir for pressurized air provided by compressor 30 wherein pressure is allowed to build and moisture is removed. Clean, dry air from wet tank 32 is provided directly to a pneumatic control unit (PCU) 34 via a conduit 36 as well as to the vehicle's brake system 38 via a conduit 40. PCU 34 is essentially a solenoid controlled manifold which in response to command signals received from ECU 28 controls the flow of air within CTIS 10.

An air manifold 42 fluidly connects chassis mounted components 12 to axle mounted components 14 and has mounted thereto a pressure transducer 44 which provides an electrical signal indicative of the pressure to which it is exposed. A vehicle speed sensor 46 provides ECU 28 with vehicle speed information. A normally open axle valve 48 is fluidly connected between manifold 42 and a T-shaped connector 50 in a conduit 52 extending between left and right tire assemblies 16 and 18. Alternatively, a pair of axle valves may be provided in order to separately connect the left and right tire volumes with manifold 42 and any number of additional axle valves 53 may also be provided for other axle assemblies. Valves 48 and 53, along with portions of air manifold, collectively form a distribution manifold 55.

Conduit 52 fluidly communicates with tire volumes 20a, 22a via rotary seal assemblies 54,56, each seal having a non-rotatable port 54a, 56a and a rotatable port 54b, 56b. Examples of rotary seals of the type used herein may be seen by reference to U.S. Pat. Nos. 4,640,331; 4,804,027; 4,883,106 and 5,174,839. Wheel valves 58,60 each include an inlet port 58a, 60a which communicates with conduit 52 via the associated rotary seal, and an outlet port 58b, 60b communicating with an associated tire volume via relief valve 59,61. Preferably, each wheel valve includes valve means 58d, 60d for venting the associated tire volume to a vent or atmospheric opening 58c, 60c in response to an appropriate vent command from ECU 28. The atmospheric opening may be at the wheel valve, as disclosed in U.S. Pat. Nos. 4,678,017; 4,782,879; 4,922,946 or 5,253,687, or may be remote from the wheel valve as disclosed in U.S. Pat. No. 4,640,331.

When CTIS 10 is in the idle state illustrated in FIG. 1, wheel valves 58 and 60 preferably isolate the tires from the inflation system in order to extend seal life by removing them from constant air pressure. Wheel valves 58,60 block air communication between tire volumes 20a, 22a and the associated valve inlets 58a, 60a and atmospheric openings 58c, 60c when air pressure at the inlet is substantially at atmospheric pressure. When the air pressure at inlets 58a, 60a is a predetermined pressure above atmospheric pressure, valve means 58d, 60d allow fluid communication between the tire volumes and conduit 52. When the air pressure at inlets 58a, 60a is a predetermined pressure less (vacuum) than atmospheric pressure, fluid communication between the tire volumes and the associated atmospheric openings 58c, 60c are allowed. Alternatively, however, CTIS 10 may be provided with wheel valves which are closed when air pressure at the inlets is substantially equal to atmospheric pressure, open for inflating the tires when the inlet air pressure is above a first predetermined minimum, and in a vent position when the inlet pressure is a predetermined pressure above atmospheric pressure and below tire pressure.

ECU 28 electronically controls the various pneumatic components of CTIS 10 by issuing command signals on an output 62. Output 62 is electrically connected to control panel 29 via a conductor 64, to pneumatic control unit 34 via conductors 66a, 66b, 66c and to axle valves 48,53 via conductors 68,70. The output signals are generated in response to input signals received by ECU 28 on an input 72. Input 72 receives signals from control panel 29 via a conductor 74, manifold pressure signals from pressure transducer 44 via a conductor 76, vehicle speed signals from speed sensor 46 via a conductor 78, and an air source pressure signal from a conductor 80 connected to a pressure switch 82 on air tank 32.

The exemplary operator control panel 29, illustrated in FIG. 2, may be used on a military or commercial vehicle and preferably includes various light emitting push switches 29a, 29b, 29c, 29d respectively labeled "Highway", "Off-Highway", "Emergency" and "Run Flat". Control panel 29 also preferably includes a switch 29e for indicating to ECU 28 whether or not the vehicle is carrying a load. Of course control panel 29 is preferably configured in accordance with a vehicle purpose and type and more or fewer switches may be provided, as may be suitable means for displaying current tire pressure, the selected mode or various warning messages. Additional detail concerning panel 29 may be seen by reference to U.S. Pat. No. 4,754,792 and published European Patent Application 0,297,837.

The information provided by switches 29a through 29e of control panel 29 instruct ECU 28 to maintain the vehicle tires within a predefined range of a desired demand pressure $P_D$ corresponding to the selected mode of operation indicated via switches 29a–29e. For example, activation of switch 29a may correspond to a first tire pressure, switch 29b to a second pressure, switch 29c to a third pressure and so forth, but these pressures are increased if switch 29e indicates a loaded vehicle condition.

Pneumatic control unit 34 preferably includes a normally closed supply valve 84, a normally open control valve 86 and a vacuum generator 88 which includes a deflate valve 90 connected between wet tank 32 and a venturi 92. Supply valve 84 has an inlet fluidly connected to the positive pressure of the air source via conduit 36 and an outlet connected to manifold 42. Control valve 86 has an inlet connected to manifold 42 and an outlet connected via a conduit 94 to a small orifice 96 opening into the throat of venturi 92.

The venturi 92 produces a vacuum or negative air pressure in conduit 94 relative to ambient atmospheric air pressure in response to a deflate signal from ECU 28 on conductor 66c. This opens solenoid valve 90 to allow a stream of air from the air source to flow through the venturi. Conduit 94 is also connected to a one-way vent valve 98 for effecting rapid venting of positive air pressure in conduit 94. Vent valve 98 includes a valving member 100 drawn to a closed position in response to a negative air pressure in conduit 94 and moved against a biasing force to an open position in response to positive pressure air in conduit 94.

CTIS 10, as thus described, is designed to automatically maintain tire pressure at or near a demand pressure $P_D$ as determined by ECU 28 based upon an operator selected pressure or mode of operation. The vehicle operator generally has the capability of commanding the system to decrease or increase tire pressure for improving tire traction or increasing load carrying capacity of the vehicle by merely activating the appropriate control panel switch. However, the system preferably automatically overrides the operator selected mode and increases tire pressure if the vehicle speed, as monitored by speed sensor 46, exceeds a predetermined speed for the selected tire pressure. CTIS 10 is similarly overridden by pressure switch 82 which acts as an electronic brake priority switch by opening in order to prevent CTIS 10 from consuming air from wet tank 32 unless the vehicle brake system 38 is fully charged.

When the vehicle ignition is energized and pressure switch 82 is closed, ECU 28 initiates a pressure check sequence of the tires on each of the axle assemblies. In addition, during vehicle operation, ECU 28 automatically initiates periodic pressure check sequences to maintain the calculated demand pressure. If the pressure of a tire is found to be a predetermined amount less than the demand pressure $P_D$ for that tire, an inflation sequence is initiated for the tire or group of tires effected.

When enhanced or maximum traction is required, the vehicle operator may command reduced tire pressure by pushing the appropriate switches on control panel 29. ECU 28 then initiates a deflate sequence unless the vehicle speed indicated by sensor 46 is greater than a predetermined amount for the selected reduced pressure. A tire inflation sequence is similarly initiated if an increased load or terrain change lead the operator to push a switch corresponding to a higher demand pressure. A pressure check sequence may also be initiated at certain points in the middle of the inflate and deflate modes to ensure arrival at the desired pressure.

When CTIS 10 is in a steady state, neither inflating, deflating or performing a pressure check, valves 84,86 and axle valves 48,53 are in the positions indicated in FIG. 1. With vacuum source solenoid valve 90 closed, manifold 42, conduit 52 and each of the rotary seals 54,56 are vented to atmosphere through vacuum generator 88 and vent valve 98 via control valve 86. Wheel valves 58,60 have closed in response to this venting.

A pressure check sequence for tires that are part of axle mounted components 14, for instance, is initiated by energizing valves 86 and 53 to the closed positions and momentarily energizing valve 84 to the open position in order to provide a positive pilot air pressure pulse sufficient to move valving means of wheel valves 58,60 to allow fluid communication between the inlets and outlets thereof. Subsequent de-energization closes valve 84. With valve 84 closed and valves 48,58,60 open, the pressure in manifold 42 and conduit 52 soon equalizes to tire pressure. ECU 28 reads this pressure via signals from pressure transducer 44, compares the current tire pressure $P_c$ to the demand pressure $P_D$ and initiates inflate/deflate sequences as required. If no further sequence is required, control valve 86 is de-energized and returned to an open position, thereby connecting the wheel valve assembly inlet ports to the vent through vacuum generator 88 and vent valve 98.

This type of pressure check sequence is initiated when ECU 28 is in an inflating or deflating sequence to ensure arrival at $P_D$, or at least within some predefined range of $P_D$. The same general sequence is also used to check tire pressure periodically to ensure tire pressure stays within the predetermined range of $P_D$ as well as to alert the driver of any abnormal conditions.

However, when performing a pressure check sequence in a "tire pressure maintenance" mode, as opposed to an "inflating" or "deflating" mode, ECU 28 is preferably controlled differently in order to account for certain events and conditions. While a vehicle is being operated in a given mode, slight tire pressure drops are common due to air loss resulting from slow leaks and varying operating conditions. These pressure drops are typically countered with an appropriate inflate sequence in order to restore correct operating pressure to the tire.

Conversely, however, a tire typically does not gain air. Increases in tire pressure over time are usually due to a temperature increase in the trapped air. Such pressure increases are normal and acceptable for proper tire performance. When tire pressures have been programmed to the proper level for the loads and speeds encountered, the pressure increase which may be expected to result from the temperature increase is within a predictable range. If tire pressure has been programmed to a value too low for the loads and speeds encountered, tire temperatures and the resulting pressures can increase to a level beyond the predictable range, resulting in diminished tire life. Thus, this invention provides an adaptive control strategy designed to minimize the possibility of reduced tire performance by adjusting the programmed demand pressure setting $P_D$ when loads and speeds result in pressure increases which indicate that too low a pressure was programmed.

Figure 3:
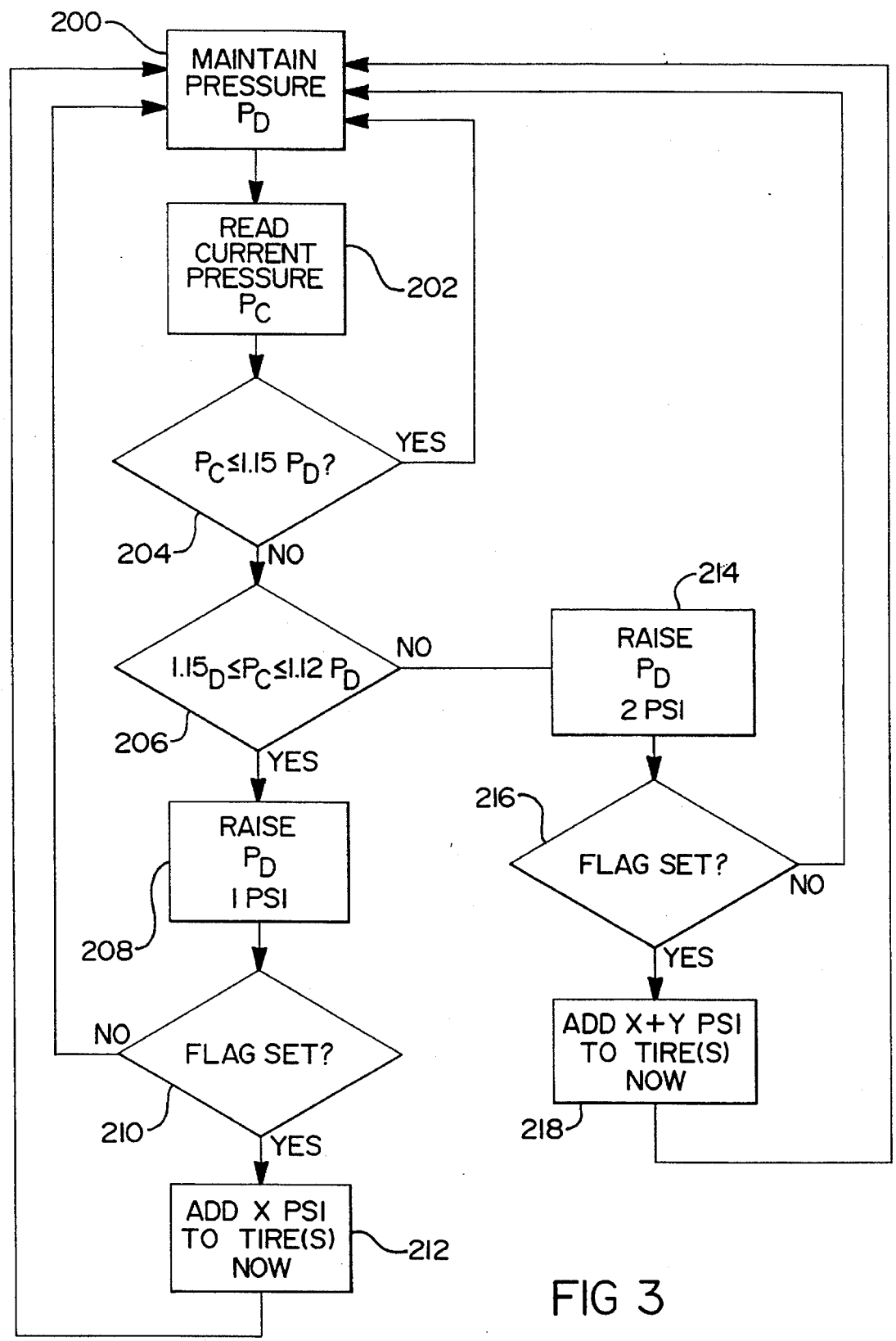
FIG. 3 is a flowchart which illustrates the program pressure override routine of the present invention.

The flowchart of FIG. 3 illustrates the adaptive program pressure setting control strategy of the present invention used to facilitate this demand pressure adjustment. This routine is preferably implemented in software run by ECU 28 but alternately may be carried out by CTIS 10 in any other suitable fashion. It preferably is run by ECU 28 only when maintaining a desired demand pressure $P_D$ and not as part of either inflating or deflating sequences.

The routine begins at block 200 wherein CTIS 10 maintains a desired demand pressure $P_D$ within a certain predefined range. In so doing, a pressure check sequence interrupt occurs periodically wherein the current pressure $P_C$ of a given tire or set of tires is measured at block 202, this measurement made in accordance with the method described above or any other suitable method. The measured or current pressure $P_C$ is then compared with the demand pressure $P_D$ at diamond 204.

Thereafter the routine uses a predictable amount of tire pressure rise due to an elevated operating temperature in a properly inflated tire to adaptively alter the preprogrammed demand pressure $P_D$. In the presently preferred embodiment, a 15%–20% rise in pressure is allotted for but these numbers may vary depending upon the type and characteristics of the tire(s) being controlled as well as upon the load carried and operating conditions encountered.

In the present illustrative embodiment, the current pressure $P_C$ is compared with 115% of the demand pressure (1.15×$P_D$). If $P_C$ is determined to be less than 115% of $P_D$ at diamond 204, tire pressure is simply maintained in a suitable fashion at block 200. Note that measured pressures above the demand pressure are for the most part attributed to heat and ignored by ECU 28. Initiating a counteractive deflate sequence at this time to bring current pressure down to demand pressure would lead to further under inflation and corresponding temperature increases.

In diamond 206, if $P_C$ is more than 115% of $P_D$ then $P_C$ is compared to 120% of $P_D$ (1.2×$P_D$). If the current pressure $P_C$ is between 115% and 120% of $P_D$, the demand pressure setting is raised at block 208. The programmed demand pressure setting $P_D$ for that mode then remains at the new adjusted level until further increased in the same manner or otherwise manually reprogrammed. Thus, the next time this mode is selected by the operator, the tires are inflated or deflated to the adjusted $P_D$ setting. In the presently preferred embodiment illustrated in FIG. 3, $P_D$ is raised by 1 psi but this amount preferably varies depending upon the current operating mode, the application and the specifications of the tires being controlled.

Optionally, additional air may be added to a tire as this rise in pressure is attributable to heat and by raising pressure the working capacity of the tire is enhanced and the air temperature therein may thereby be lowered. In the illustrative embodiment of FIG. 3, this is done on an optional basis via setting an appropriate flag. If the flag is not set in diamond 210, pressure is maintained at the updated demand pressure setting (in this exemplary embodiment $P_D$+1 psi) at block 200. If an add air flag has been set, an amount of air is added to the tires in block 212 and thereafter maintained in block 200. The amount of air added, x psi in FIG. 3, can be set to be dependent upon any one of a number of factors.

In a similar fashion, it the current pressure is more than 120% of $P_D$ at diamond 206, $P_D$ may be raised at block 214, preferably by an amount larger than that added in block 208. Similarly, if a flag is set in diamond 216, the conditions being either the same or different than those leading to setting of the flag in diamond 210, additional air is added at block 218. In this manner, the degree to which the pressures were under-programmed can be accommodated with bigger changes for more grossly underinflated tires. Preferably, the rise in pressure is determined as a function of various factors including manufacturer's recommendations.

Figure 4:
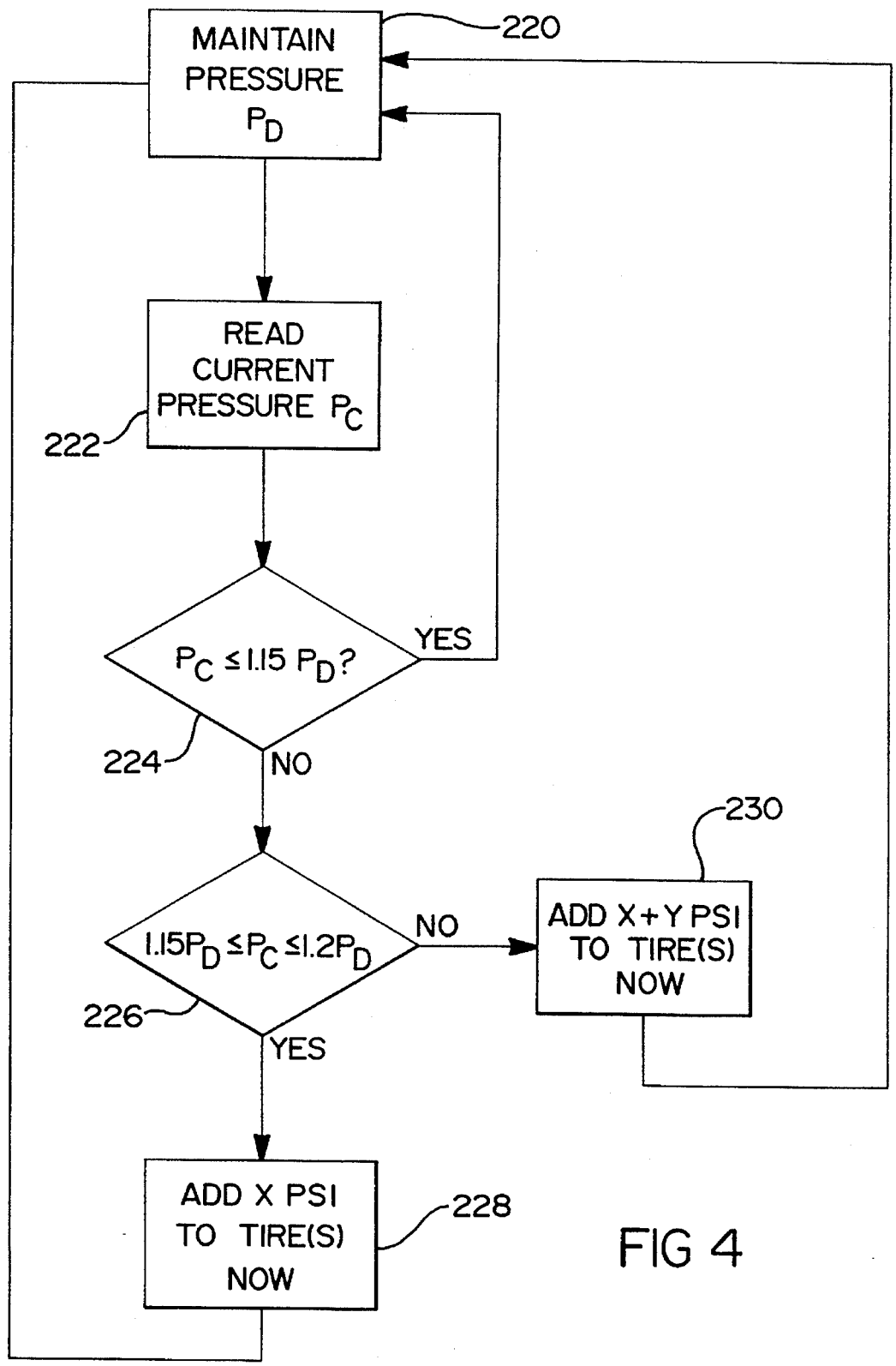
FIG. 4 is a flowchart which illustrates an alternate embodiment of the override routine illustrated in FIG. 3.

Alternately, however, the system may be configured only to add air to the tires under certain conditions, without making any permanent adjustment to the demand pressure setting. This is particularly advantageous in situations where it is likely that certain speeds or loads may be transient and only occasionally exceed those specifically accounted for in initial demand pressure settings. The routine for accomplishing this is illustrated in the flowchart of FIG. 4.

As shown therein ECU 28 maintains a current demand pressure setting $P_D$ at block 220 in the usual manner. A periodic pressure check sequence is performed at block 222 wherein the current pressure $P_C$ is obtained. The current pressure is compared to the preset demand pressure at diamond 224. If $P_C$ is less than a predetermined amount, in the present exemplary embodiment 115% of $P_D$, the preset demand pressure is maintained. If, however, $P_C$ exceeds $P_D$ by the predetermined amount, $P_C$ is compared to a second predetermined amount, in this instance 120% of $P_D$, at diamond 226.

If $P_C$ is between these predetermined pressures, air is added to the tire at block 228 and the preprogrammed demand pressure setting is simply maintained as usual in block 220. If $P_C$ exceeds the second predetermined limit, a different amount of air or air pressure may be added at block 230, this second amount preferably being larger than the first amount in order to account for an even greater underinflated tire condition. Again, $P_D$ is thereafter maintained in the usual fashion at block 220.

Thus, the present method facilitates adaptive control of tire pressure and helps to ensure tire pressure is adequate for a given set of conditions even when set by the operator to be too low for the loads and speeds encountered in a given mode. However, it should be readily apparent that the present routine is subject to a wide variety of modifications directed at optimizing tire pressure in order to enhance efficiency and improve tire life. For instance, the amount by which current pressure must exceed demand pressure in order for demand pressure to be incremented may be a discrete value rather than a percentage, or demand pressure may simply be raised to the current pressure. Similarly, the routine may be carried out in any number of increments and the cutoff amounts, increases in demand pressure settings and additional air pressure amounts may be preset for each set of conditions or calculated on a real time basis.

The foregoing discussion discloses and describes an exemplary embodiment of the present invention. One skilled in the art will readily recognize from such discussion, and from the accompanying drawings and appended claims, that certain changes, modifications and variations can be made therein without departing from the spirit and scope of the invention as defined in the following claims.

What is claimed is:

1. In a vehicle central tire inflation system wherein the fluid pressure in at least one inflatable tire is maintained at a preselected demand pressure setting $P_D$, a method of adaptively controlling said inflation system to account for heat induced rises in tire pressure comprising the steps:

measuring the pressure of said fluid in said tire to obtain a current tire pressure $P_C$;

comparing said current tire pressure $P_C$, to said demand pressure setting $P_D$, then, as a result of the comparison, either:

raising said demand pressure setting by a first predefined amount if said current tire pressure exceeds said demand pressure setting by at least a first predetermined amount; or, maintaining said demand pressure setting otherwise.

2. The method of claim 1 further comprising the step of adding first predetermined amount of pressurized fluid to said tire if said current tire pressure exceeds said demand pressure setting by at least said predetermined amount.

3. The method of claim 1 wherein said predetermined amount is a percentage of said demand pressure setting.

4. The method of claim 3 wherein said percentage is approximately 15%.

5. The method of claim 1 further comprising the step of raising said demand pressure setting by a second predefined amount if said current tire pressure exceeds said demand pressure setting by at least a second predetermined amount.

6. The method of claim 5 wherein said second predetermined amount is greater than said first predetermined amount.

7. The method of claim 6 wherein said second predefined amount is greater than said first predefined amount.

8. The method of claim 5 wherein said second predetermined amount is a percentage of said demand pressure setting.

9. The method of claim 8 wherein said percentage is approximately 20%.

10. The method of claim 5 further comprising the step of adding a first predetermined amount of pressurized fluid to said tire if said current tire pressure exceeds said demand pressure setting by at least said first predetermined amount.

11. The method of claim 10 further comprising the step of adding a second predetermined amount of pressurized fluid to said tire if said current tire pressure exceeds said demand pressure setting by at least said second predetermined amount.

12. The method of claim 11 wherein said second amount of pressurized fluid added to said tire is larger than said first amount of pressurized fluid added.

13. The method of claim 1 wherein said demand pressure setting comprises a range of pressures and said comparing step comprises comparing the current tire pressure $P_C$ to the highest value in the range.

14. The method of claim 1 wherein said first predefined amount is varied with said demand pressure setting.

15. The method of claim 1 wherein said first predefined amount is varied with the operating conditions of the vehicle and the load it is carrying.

16. In a vehicle central tire inflation system wherein the fluid pressure in at least one inflatable tire is maintained at a preselected demand pressure setting $P_D$, a method of adaptively controlling said inflation system to account for heat induced rises in tire pressure comprising the steps:

measuring the pressure of said fluid in said tire to obtain a current tire pressure $P_C$;

comparing said current tire pressure $P_C$ to said demand pressure setting $P_D$;

then, as a result of the comparison, adding a first predefined amount of pressurized fluid to said tire if said current tire pressure exceeds said demand pressure setting by at least a first predetermined amount.

17. The method of claim 16 wherein said predefined amount is varied with the operating conditions of the vehicle and the load it is carrying.

18. The method of claim 16 further comprising the step of adding a second predefined amount of pressurized fluid to said tire if said current tire pressure exceeds said demand pressure setting by at least a second predetermined amount.

19. The method of claim 1 wherein said central tire inflation system is controlled so as to perform a tire pressure check sequence on a periodic basis and said measurement of fluid pressure in said tire is performed as part of said pressure check sequence.

* * * * *